United States Patent [19]

Cresap et al.

[11] 4,270,711
[45] Jun. 2, 1981

[54] HELICOPTER LANDING GEAR WITH CROSSTUBE PIVOT

[75] Inventors: Wesley L. Cresap, Fort Worth; Alan W. Myers, Burleson, both of Tex.

[73] Assignee: Textron, Inc., Providence, R.I.

[21] Appl. No.: 7,313

[22] Filed: Jan. 29, 1979

[51] Int. Cl.³ ............................................. B64C 25/52
[52] U.S. Cl. ............................. 244/17.17; 244/100 R; 244/108
[58] Field of Search ................. 244/17.17, 100 R, 108

[56] References Cited

U.S. PATENT DOCUMENTS

| 3,193,221 | 7/1965 | Victorian et al. | 244/100 R |
| 3,506,222 | 4/1970 | Anderson . | |
| 3,716,208 | 2/1973 | Fagan et al. | 244/108 |
| 3,997,133 | 12/1976 | Fagan . | |
| 4,142,698 | 3/1979 | Niebanck et al. | 244/17.17 |

FOREIGN PATENT DOCUMENTS 1205263  9/1970 United Kingdom ................ 244/17.17

Primary Examiner—Charles E. Frankfort
Attorney, Agent, or Firm—Richards, Harris & Medlock

[57] ABSTRACT

A helicopter landing gear assembly includes a pair of crosstubes (20, 22) having a pair of struts (28, 30) connected at the outboard ends thereof. A first of the crosstubes (22) is connected to the helicopter fuselage (16) at a pair of laterally spaced points (24, 26). The second of the crosstubes (20) is joined by a pivot connection (32) to a structural bridge (10) positioned above the second crosstube. The structural bridge (10) is connected at its outer ends to the fuselage main beams (12, 14). The structural bridge (10) connected to the second crosstube (20) permits the helicopter fuselage (16) to pivot about a fore-aft axis thereof to lower the natural roll frequency of the helicopter airframe and therefore increase the margin of stability to prevent ground resonance.

7 Claims, 2 Drawing Figures

HELICOPTER LANDING GEAR WITH CROSSTUBE PIVOT

FIELD OF THE INVENTION

The present invention pertains to rotary winged aircraft, and more particularly, to a landing gear apparatus for such aircraft.

BACKGROUND ART

The typical landing gear for a helicopter comprises crosstube members rigidly attached to the base of the helicopter fuselage and joined at the ends to horizontally disposed skids. The crosstubes and skids are made of a flexible tubular material to support the aircraft and perform as a shock member upon ground contact.

The flexibility of the landing gear structure, however, causes the helicopter airframe and landing gear together to have various vibrational modes. When the frequencies of any of these vibrations are the same or are related to the vibrational frequency of the helicopter rotor blade about its lead-lag hinge, energy is transmitted from the rotating system to the fixed (nonrotating) system. Under these conditions, a potentially serious problem termed "ground resonance" arises. When ground resonance occurs, the vibration of the rotor blade causes the helicopter fuselage to vibrate, the vibrational energy of the rotor blade being transferred to the fuselage with the resulting vibrations being reinforced. The reinforcement of the vibrations causes violent shaking of the aircraft which can often lead to structural damage.

Therefore, a need exists for a landing gear structure which tunes the helicopter airframe to have a natural frequency that is lower than that of the rotor blades when operating at or below their normal rotational speed. The helicopter airframe natural frequency must be offset from that of the rotating rotor blade to prevent the occurrence of ground resonance.

DISCLOSURE OF THE INVENTION

A landing gear structure for a helicopter includes a pair of crosstubes where the first crosstube is fixed to the helicopter fuselage at a pair of laterally spaced points. The landing gear has a structural bridge fixed to the base of the fuselage at a pair of laterally spaced points above the second crosstube with a pivotal connection established between the structural bridge and the second crosstube. The bridge permits pivotal action of the second crosstube about a fore-aft axis of the helicopter. Such pivotal action reduces the roll frequency of the helicopter airframe when the aircraft is at rest on the ground.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE INVENTION

Figure 1:
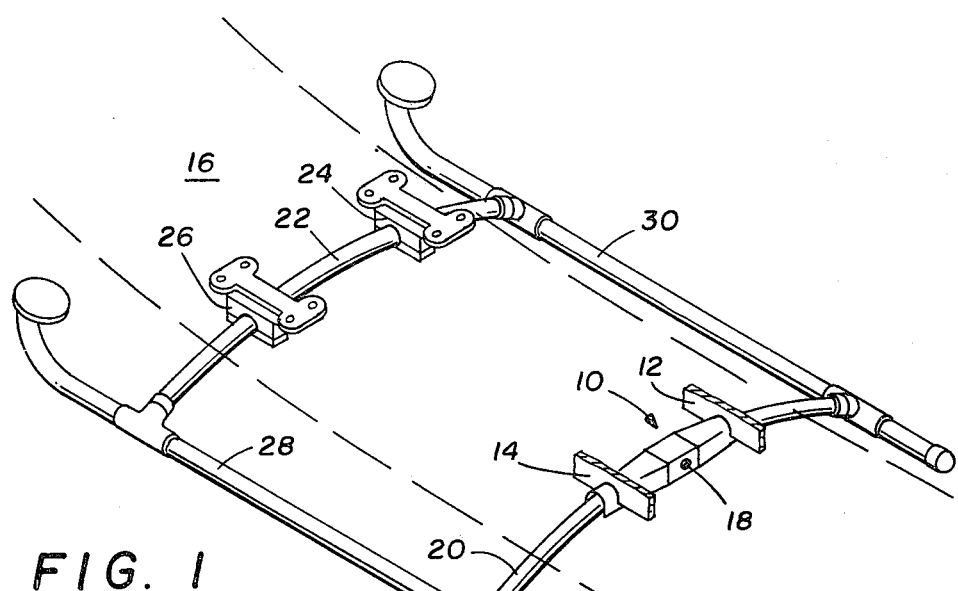
FIG. 1 is a perspective view of a helicopter landing gear incorporating the structural bridge of the present invention.

Referring to FIG. 1, the structural bridge of the present invention is designated with the numeral 10. Bridge 10 has a generally U-shaped cross section and is connected at either end to structural beams 12 and 14 which form a part of the helicopter fuselage 16. The dotted lines in FIG. 1 show the general outline for fuselage 16. Bridge 10 is connected by a pivot pin 18 to an aft crosstube 20 which comprises a part of the helicopter landing gear assembly. A forward cross-tube 22 is connected to the helicopter fuselage 16 by connecting brackets 24 and 26. The crosstubes 20 and 22 are turned down at each end where they are joined to port and starboard skids 28 and 30, respectively. The helicopter fuselage is therefore connected to the landing gear assembly by brackets 24 and 26 and through beams 12 and 14 to bridge 10.

Figure 2:
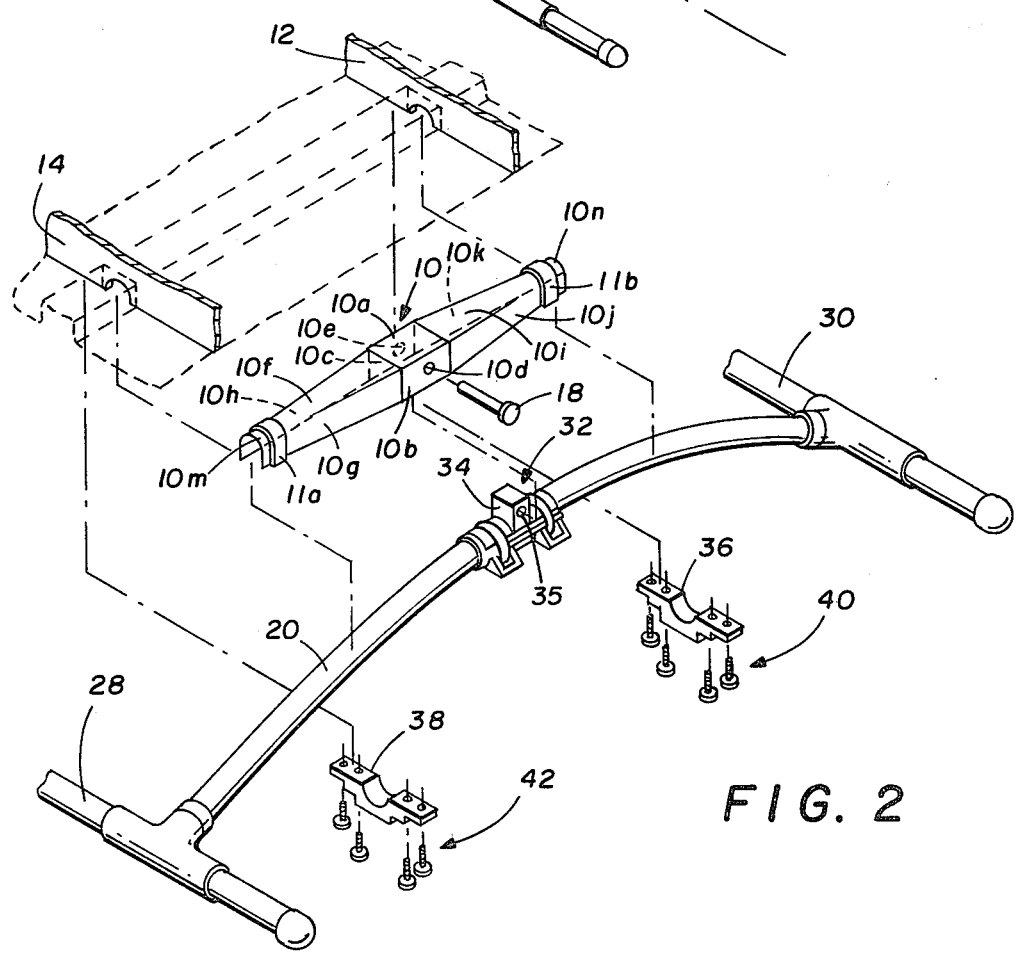
FIG. 2 is an exploded perspective view of the landing gear structure of the present invention.

The bridge structure of the present invention is described in greater detail in reference to FIG. 2. Bridge 10 comprises a center section, body sections on each side of the center section and end sections joined to the body sections. The bridge can be fabricated from a single steel or aluminum plate to have the various sections described above. The center section has a top plate 10a joined along two edges thereof to side plates 10b and 10c which have therein holes 10d and 10e. Holes 10d and 10e receive pivot pin 18. The port body section has elongate top and side plates, respectively 10f, 10g and 10h. Likewise, the starboard body section has elongate top and side plates, respectively 10i, 10j and 10k. The end sections comprise U-shaped members 10m and 10n.

A U-shaped pad 11a is positioned over end section 10m while a similar U-shaped pad 11b is positioned over end section 10n.

A clamp assembly 32 is bolted to the center of crosstube 20 and includes block 34 having a hole 35 therein for receiving pivot pin 18. Block 34 is adapted to fit within bridge 10 between side plates 10b and 10c. Hole 35 is positioned to be coaxially aligned with holes 10d and 10e.

Clamp fittings 36 and 38 are located on the lower side of crosstube 20 and are bolted respectively to beams 12 and 14 by bolt sets 40 and 42.

Bridge 10 is secured to clamp assembly 32 by pivot pin 18 which passes through bridge 10 and hole 35 in block 34. Thus, bridge 10 is pivotally attached to crosstube 20. Clamp fittings 36 and 38 are secured to beams 12 and 14 of the helicopter fuselage so that the crosstube 20 is slightly flexed upward against pivot pin 18 when the landing gear assembly is in an unloaded condition. This tension holds the crosstube 20 in a secure and stable position when the helicopter is in flight.

When the aircraft is on the ground and the landing gear assembly is loaded, the crosstube 20 is flexed upward so that it is no longer in contact with the clamp fittings 36 and 38. However, the aft crosstube 20 is not flexed upward sufficiently for it to come into contact with the bridge 10 under routine operating conditions. Thus, in this condition, the bridge 10 is connected to the aft crosstube 20 only through the pivot pin 18. The weight of the helicopter which is carried through beams 12 and 14 to the bridge assembly 10 is transmitted to the landing gear solely through pin 18.

When a helicopter is resting on the ground but is in the process of running the rotor up to operational speed, vibrations of increasing frequency are generated by the rotor and transmitted to the airframe. The non-rotating portion of the airframe has a number of natural vibrational modes dependent upon the airframe configuration and the flexibility of various structural components. If the vibrations generated by the rotor couple to any of the vibrational modes of the airframe, the rotor kinetic energy can be suddenly transferred to the air-frame when it generates violent vibrations. This condition is termed "ground resonance." To avoid the occurrence of ground resonance, the helicopter airframe must be constructed in such a manner that the rotor vibrations are not coupled into the airframe. The bridge structure of the present invention lowers the natural fuselage/landing gear pitch and roll mode frequencies to give a greater ground resonance stability margin.

When the helicopter 16 is resting on the ground, the crosstube 20 is flexed upward away from the clamp fittings 36 and 38 so that a part of the helicopter weight is carried through pivot pin 18. This condition then allows the bridge 10 which is supporting the fuselage to rock back and forth about a median fore-aft axis of the aircraft, the axis being defined by pin 18. The helicopter is held in a stable position by three-point suspension, the forward two suspension points being provided by brackets 24 and 26 which are connected to the forward crosstube 22. The single pivot support on the aft crosstube permits the airframe to roll (rock) at a lower rate than occurs when the airframe is rigidly attached to the crosstube. This further offsets the airframe vibrational modes from the rotor frequencies to enhance the margin of stability to reduce the possibility that the helicopter will encounter ground resonance.

In a hard landing situation, the crosstube 20 is forced upward into the bridge 10 which is in turn forced into the fuselage beams 12 and 14. The deformation of these components serves to absorb the energy of a hard landing and to protect the occupants and other helicopter components.

Although an embodiment of the invention has been illustrated in the accompanying drawings and described in the foregoing detailed description, it will be understood that the invention is not limited to the embodiments disclosed, but is capable of numerous rearrangements, modifications and substitutions without departing from the scope of the invention.

We claim:

1. In a helicopter having a pair of crosstubes forming a part of a landing gear where a first of the crosstubes is fixed to the helicopter's fuselage at a pair of laterally spaced points, the improvement comprising:
   (a) a structural bridge fixed to said fuselage at a pair of laterally spaced points above the second of said crosstubes, and
   (b) a pivotal connection between said structural bridge and the second of the crosstubes including a pin substantially parallel to the fore-aft axis of the helicopter and pivotally engaging said structural bridge and the second of the crosstubes, said connection of the structural bridge being at a point intermediate of the points of connection of said bridge to said fuselage to provide for pivotal action of said structural bridge about a median fore-aft axis of the helicopter.

2. In a helicopter having a pair of crosstubes forming a part of a landing gear, the improvement as recited in claim 1 wherein the structural bridge comprises a U-shaped, elongate member positioned to face the open side thereof downward toward said second crosstube.

3. In a helicopter having a pair of crosstubes forming a part of a landing gear where a first of the crosstubes is fixed to the helicopter's fuselage at a pair of laterally spaced points, the improvement comprising:
   (a) a structural bridge fixed to said fuselage at a pair of laterally spaced points above the second of said crosstubes, and
   (b) a pivotal connection between said structural bridge and the second of said crosstubes for pivotal action of said structural bridge about a median fore-aft axis of the helicopter, said second crosstube being tensioned toward said bridge against said pivotal connection by clamp fittings encompassing said second crosstube, disposed on either side of said pivotal connection and connected to said fuselage.

4. In a helicopter landing gear assembly where a first of a pair of crosstubes is fixed to the helicopter fuselage, the improvement comprising:
   (a) an elongate, U-shaped structural bridge fixed to said helicopter fuselage at a pair of laterally spaced points above a second of said crosstubes,
   (b) a pivot connection having a clamp attachment to said second crosstube and a block with a longitudinally aligned hole therein, said pivot connection including a pin passing through said hole and through a center portion of said structural bridge to permit pivotal movement thereof about a fore-aft axis of said helicopter fuselage, and
   (c) clamp fittings positioned below said second crosstube on opposite sides of the pin of said pivot connection and secured to the helicopter fuselage for tensioning said second crosstube upward against said pin when the landing gear assembly is not loaded.

5. In a helicopter landing gear assembly, the improvement as recited in claim 4 wherein said first crosstube is forward of said second crosstube.

6. In a helicopter landing gear assembly, the improvement as recited in claim 4 wherein said structural bridge comprises:
   (a) a center section having parallel side plates connected together by a top plate and having a hole passing through each of said side plates, said holes coaxially aligned,
   (b) a body section joined to either side of said center section, each said body section comprising elongate side plates and an elongate top plate joined thereto, said elongate top plate having a reducing taper extending from said center section outward, and
   (c) end sections joined to the outboard ends of said body sections, said end sections being U-shaped and having the open segment thereof facing said second crosstube.

7. In a helicopter landing gear assembly, the improvement as recited in claim 6 further including a U-shaped pad positioned over each of said end sections.

* * * * *